(12) United States Patent
King

(10) Patent No.: US 6,493,206 B1
(45) Date of Patent: Dec. 10, 2002

(54) ELECTRICAL CAPACITOR WITH IMPROVED HEAT TRANSFER CHARACTERISTICS

(75) Inventor: William King, Christiana, PA (US)

(73) Assignee: High Energy Corp., Rancocas, NJ (US)

(*) Notice: Subject to any disclaimer, the term of this patent is extended or adjusted under 35 U.S.C. 154(b) by 0 days.

(21) Appl. No.: 09/399,462

(22) Filed: Sep. 20, 1999

(51) Int. Cl.⁷ .............................. H01G 4/32; H01G 2/20; H01G 7/00
(52) U.S. Cl. .................. 361/301.5; 361/308.1; 29/25.42
(58) Field of Search ................ 361/301.5, 301.1, 361/301.2, 303, 306.1, 306.2, 308.1, 308.2, 308.3, 311, 323, 328, 329, 330; 29/25.42

(56) References Cited

U.S. PATENT DOCUMENTS

| | | | |
|---|---|---|---|
| 3,094,651 A | * 6/1963 | Lehner et al. | 361/323 |
| 3,292,063 A | * 12/1966 | Kellerman | 361/307 |
| 3,593,072 A | * 7/1971 | Bailey | 361/308.3 |
| 3,836,830 A | 9/1974 | Akopian et al. | 317/261 |
| 3,855,507 A | * 12/1974 | Hoyler | 361/273 |
| 4,115,600 A | * 9/1978 | Schroeder et al. | 29/25.42 |
| 4,422,127 A | * 12/1983 | Lavene | 361/323 |
| 4,586,112 A | 4/1986 | MacDougall | 361/330 |
| 4,633,369 A | * 12/1986 | Lapp et al. | 24/DIG. 22 |
| 4,922,375 A | 5/1990 | MacDougall et al. | 361/273 |

* cited by examiner

Primary Examiner—Dean A. Reichard
Assistant Examiner—Eric W. Thomas
(74) Attorney, Agent, or Firm—Drinker Biddle & Reath LLP

(57) ABSTRACT

A wound metalized film and metal foil capacitor with layers arranged and wound to provide internal parallel capacitors utilizing offsets between the internal spacings, or margins, of the metal electrodes. The arrangement permits more efficient heat transfer from the interior of the capacitor by the metal electrodes from internal regions that generate heat.

25 Claims, 4 Drawing Sheets

US 6,493,206 B1

ELECTRICAL CAPACITOR WITH IMPROVED HEAT TRANSFER CHARACTERISTICS

FIELD OF THE INVENTION

The present invention relates to a wound capacitor preferably formed from layers of metalized film and metal electrodes. The capacitor has improved heat transfer performance that reduces internal thermal stress and permits increased current-carrying capacity.

BACKGROUND OF THE INVENTION

A metalized film capacitor is formed from layers of metallic film on a dielectric substrate. A suitable metal, such as aluminum, is vapor deposited on the substrate. The thickness of the metallic film is typically in the range of 100 to 400 angstroms. The dielectric substrate is generally a thermoplastic resin, such as polypropylene. The thickness of the substrate is significantly greater than the thickness of the film. Two metalized film layers are convolutely wound together to form to form he capacitor. In this configuration, the dielectric substrates separate the two metalized film layers, which form the electrodes of the capacitor.

Film and foil (film/foil) capacitors are formed from four alternating layers of a dielectric and a metallic foil. The two layers of metallic foil form the electrodes of the capacitor. The thickness of the foil is typically in the range of 0.0005 to 0.0025 centimeters (cm). In this configuration, the dielectric layers separate the two metal electrodes. By extending the longitudinal ends of the two metallic films layer beyond the ends of the dielectric layers, at opposite axial ends of the capacitor, an extended foil capacitor is formed. A conductive metal end-spray can be applied to the extended whorl of metallic foils at each axial end of the capacitor to provide for the connection of terminals to the capacitor.

A hybrid of a metalized film and a film/foil capacitor is known as a metalized film and foil (metalized film/foil) capacitor. FIGS. 1(a) and 1(b) show typical cross sectional layering for series-wound metalized film/foil capacitors known in the art. In FIG. 1(a), a metalized film layer, composed of a metalized film 152 on a dielectric substrate 153, is wound between a dielectric layer 130 and a layer composed of two separate strips of metallic foil 120 and 122. The strips of metallic foil form the two metal electrodes of an extended foil capacitor. FIG. 1(b) illustrates a common variation of the hybrid capacitor in FIG. 1(a). For the configuration shown in FIG. 1(b), two metalized film layers are wound with their metallic films in contact with each other to double the thickness of the metalized film conductor. The space between the inner longitudinal ends of the foils in FIGS. 1(a) and 1(b) is referred as the margin. As show in these figures, the margin has a width 190. Minimum cross sectional margin widths are primarily driven by voltage withstand values determined from the working voltages for the wound capacitor. Typical widths for the margin at 600 volts ac are on the order of 0.4 cm.

Internal heat is generated in a capacitor in two ways, namely dielectric heating and conduction losses. Dielectric heating is linearly proportional to the operating frequency of the capacitor and proportional to the square of its operating voltage. Conductive ($I^2R$) losses are proportional to the square of the current carried by the capacitor. Consequently, for high frequency and high current capacitors, the amount of internal heat generated is a significant and limiting factor for the use of a metalized film/foil capacitor. The capacitor temperature due to internal heating plus the ambient temperature should not exceed the maximum allowable operating temperature for the selected dielectric, or it is possible that the capacitor will open or, in some cases, rupture.

In metalized film/foil capacitors, the electrodes formed by the metalized film have a significant resistance in comparison with the resistance of the metallic foil metalized film. Consequently, significant conduction losses are generated in the conductor formed by the metalized film. The metallic foils have a relatively high value of thermal conductivity and serve as an efficient conductor of heat from the interior of the wound capacitor. Conversely, the dielectric substrate typically is a very poor thermal conductor. Therefore, the metallic foils play an important part in the dissipation of heat from the dielectric losses and the conduction losses in the metalized film.

In a series-wound capacitor with electrodes formed from extended metallic foils, the foils act as an effective heat sink in contact with the dielectric substrate except for the region formed by the margin. Current flows across the margin through the metalized film. Internal heat will build up in the region formed by the metalized film bridging the margin. In the prior art capacitors shown in FIGS. 1(a) and 1(b), the nearest surface of metallic foil from the center of the metalized film bridging the margin is equal to half of the margin's width. This is more clearly appreciated when looking at a cross section of multiple coils of the layers, such as in FIG. 1(c), for two coils of the prior art capacitor in FIG. 1(b). For the typical margin width of 0.4 cm noted above, the nearest distance to the surface of a metallic foil from the center of the metalized film bridging the margin will be 0.2 cm.

The present invention addresses the problem of internal heat buildup by using two parallel capacitors wound together with adjacent margins being offset so that all (including the center) of the metalized film bridging the margin is no further away than approximately the thickness of one dielectric substrate from the surface of a metallic foil. For the typical 0.001 cm thickness of a dielectric substrate, the nearest distance to the surface of a metallic foil from all of the metalized film bridging the margin will be 0.001 cm. This is a significant decrease in the distance to a metallic foil that will act as a heat sink for heat transfer from the metalized film bridging the margin. This results in a significant increase in the amount of current that can be carried by a capacitor using the same amount of materials as that for the prior art capacitors shown in FIGS. 1(a) and 1(b).

SUMMARY OF THE INVENTION

In its broadest aspect, the present invention is an axially wound capacitor formed from at least two composite layers. Each composite layer is formed from component layers. In the preferred embodiment of the invention, one electrode layer and two metalized film layers form the minimum component layers. Each electrode layer is formed from two metal electrodes. There is a space, or margin, between the adjacent longitudinal ends of the two metal electrodes. The two metal electrodes have their outer longitudinal ends disposed at opposite axial ends of the capacitor. The longitudinal ends of all metal electrodes at each axial end of the capacitor are electrically connected together to form the two external electrical connection points for the capacitor. Each of the two metalized film layers of each composite layer is formed from a metalized film on a dielectric substrate. The metalized film layers for the two substrates are disposed adjacent to each other. All composite layers that make up the capacitor are similarly oriented to each other with the exception that the margins in the electrode layers of adjacent composite layers are offset from each other.

Equal widths of diagonally opposed metal electrodes in adjacent electrode layers can be provided. The width of the margins in all electrode layers can be equal, and the margins can be offset in adjacent electrode layers by the width of a margin. In alternate embodiments of the invention, a dielectric layer can replace one of the two metalized film layers in one or more of the composite layers that form the capacitor. Also, a single metalized film layer can replace the two metalized film layers in at least one composite layer of the capacitor when its metalized film is placed adjacent to a dielectric layer, or the dielectric substrate of a metalized film layer. A dielectric layer can be placed between one or more adjacent composite layers.

In another aspect, the present invention is a wound capacitor formed from the a plurality of layers. The first layer is composed of first and second metal electrodes. There is a space, or first margin, between the adjacent longitudinal ends of the first and second metal electrodes. The second layer consists of a metalized film layer that is composed of a metalized film on a dielectric substrate. The second layer has its dielectric substrate facing the first layer. The third layer is a second metalized film layer that has its metalized film placed adjacent to the metalized film of the second layer. The fourth layer is composed of third and fourth metal electrodes. The electrodes are oriented so that the first and third metal electrodes have their outer longitudinal ends at the same axial end of the capacitor. There is a second margin between the third and fourth metal electrodes. The second margin is offset from the first margin. The fifth layer is a third metalized film layer that has its dielectric substrate adjacent to the fourth layer. The sixth layer is a fourth metalized film layer that has its metalized film adjacent to the metalized film of the fifth layer. The half-widths of the first and second margins are greater than the thickness of the first, second, third, or fourth metalized film layers. Equal widths of the first and fourth metal electrodes, and of the second and third metal electrodes can be provided. The widths of the first and of the second margins can be equal, and the margins can be offset from each other by the width of a margin. In alternate embodiments of the invention, at least one of the four metalized film layers can be replaced by a dielectric layer.

In another aspect, the invention is a method of manufacturing a wound capacitor by simultaneously winding layers of substantially equal lengths around a core. The first layer is composed of first and second metal electrodes. They are wound with a space, or first margin, between their adjacent longitudinal ends. The second layer consists of a metalized film layer that is composed of a metalized film on a dielectric substrate. It is wound with its dielectric substrate facing the first layer. The third layer is a second metalized film layer that has its metalized film placed adjacent to the metalized film of the second layer. The fourth layer is composed of third and fourth metal electrodes. The electrodes are oriented so that the first and third electrodes have their outer longitudinal ends at the same axial end of the capacitor. A second margin is formed between the third and fourth metal electrodes. The second margin is offset from the first margin. The fifth layer is a third metalized film layer that has its dielectric substrate adjacent to the fourth layer. The sixth layer is a fourth metalized film layer that has its metalized film adjacent to the metalized film of the fifth layer. In alternative embodiments of the invention, the layers may be reverse wound around the core. During manufacture, the half-widths of the first and second margins are maintained with a length greater than the thickness of the second, third, fifth, or sixth layers. The core, if electrically non-conductive, may be retained in the capacitor. Alternatively,-the core may be removed after winding the capacitor. If the core is removed, the wound capacitor may be flattened.

The wound capacitor can be manufactured with equal widths for the first and fourth metal electrodes, and for the second and third metal electrodes. Furthermore, the wound capacitor can be manufactured with equal widths for the first and second margins, and the margins can be offset from each other by this equal margin width. The wound capacitor can be manufactured so that the outer longitudinal ends of the four electrodes extend beyond the outer longitudinal ends of the metalized film layers. With this arrangement, the capacitor can be further processed by metal spraying the axial ends of the capacitor to form a common electrical connection between the first and third metal electrodes at one axial end of the capacitor, and between the second and fourth metal electrodes at the other end of the capacitor. A coating of solder can be provided over the ends of the capacitor. Oil can be inserted into the windings of the capacitor by scoring the solder to the outer longitudinal edges of the metalized film layers and injecting the oil into the windings. Electrical terminals can be attached to the axial ends of the capacitor to provide a means for connecting the capacitor to an external circuit. In alternative manufacturing processes, at least one of the metalized film layers can be replaced by a dielectric layer. In these embodiments, an electrode layer, a metalized film layer, or a dielectric layer may be the first layer wound on the core.

These and other aspects of the invention will be apparent from the owing description and the appended claims.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1A:
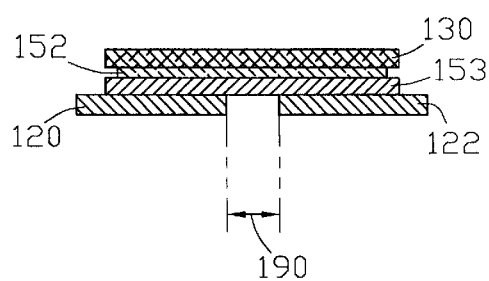
FIGS. 1(a) and 1(b) are cross sectional views of the arrangement of layers used with a prior art series-wound metalized film/foil capacitor.
Figure 1B:
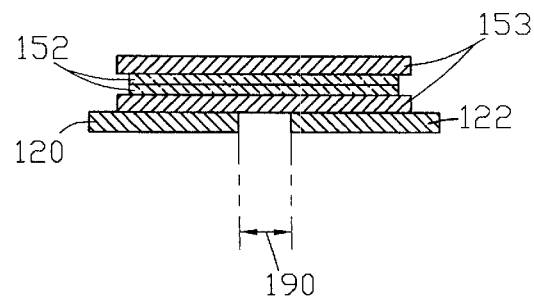
Figure 1C:
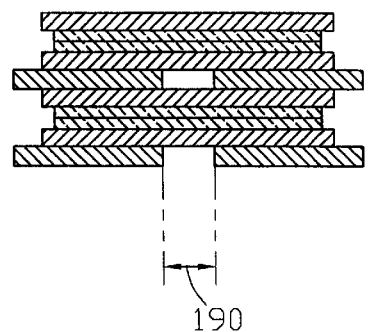
FIG. 1(c) is a cross sectional view of two coils of the whorl that is formed by winding the prior art capacitor shown in FIG. 1(b).
Figure 2:
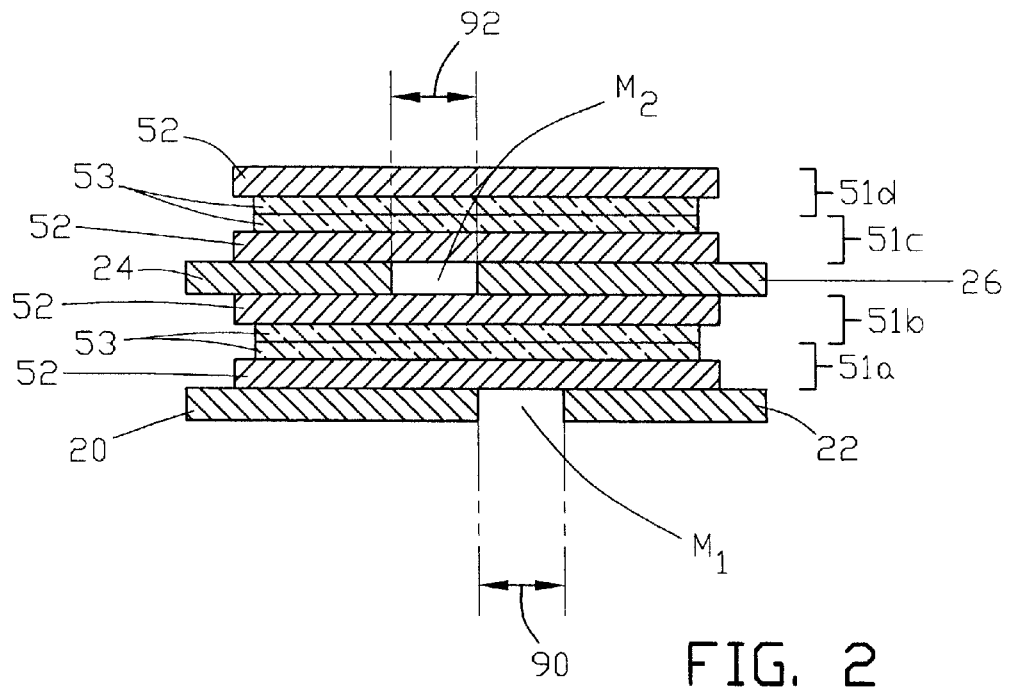
FIG. 2 is a cross sectional view of the arrangement of layers used for the wound capacitor in one embodiment of the present invention.
Figure 3:
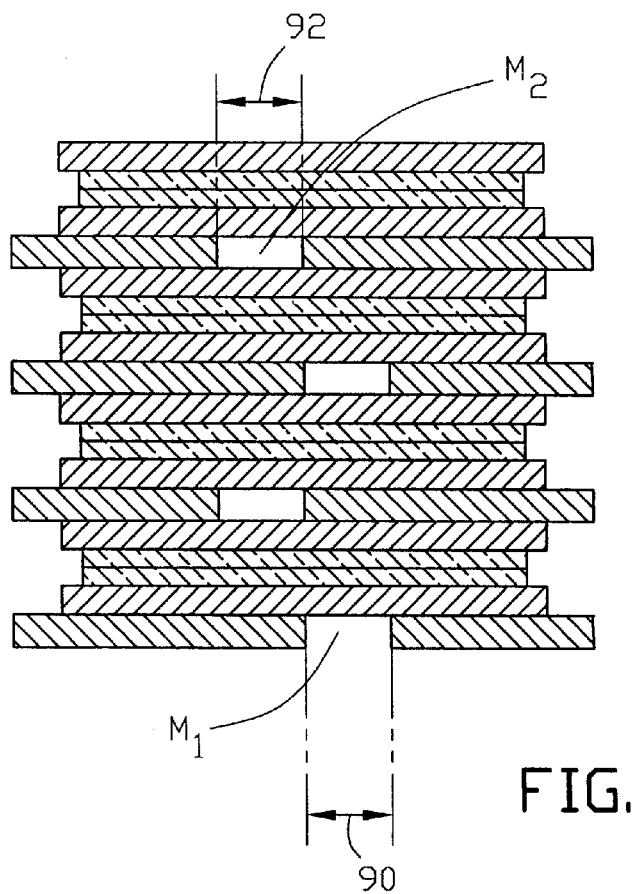
FIG. 3 is a cross section view of two coils of the whorl that is formed by winding the capacitor of the present invention with the layers shown in FIG. 2.
Figure 4:
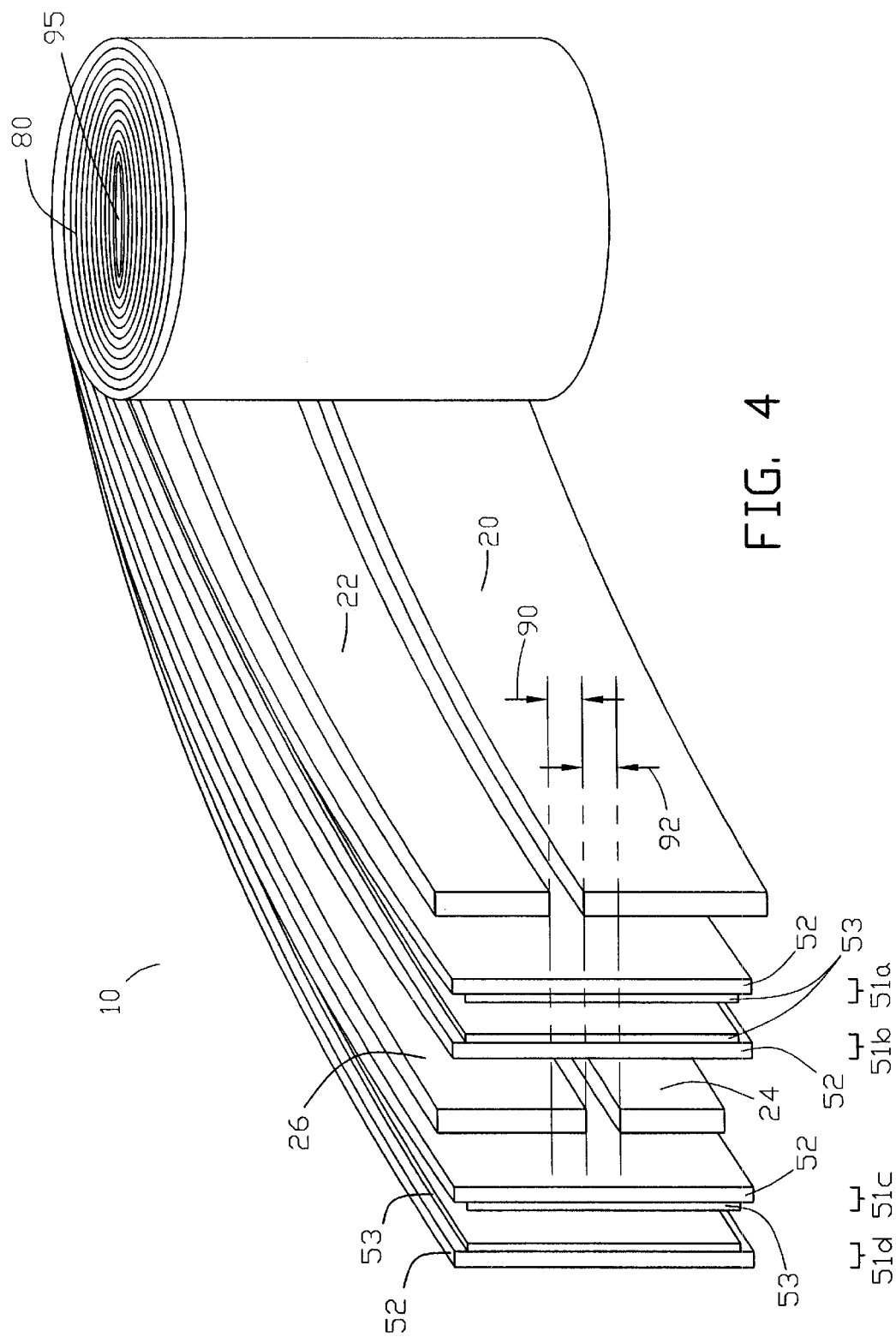
FIG. 4 is a perspective view of one embodiment of the present invention with the layers partially unwound.
Figure 5A:
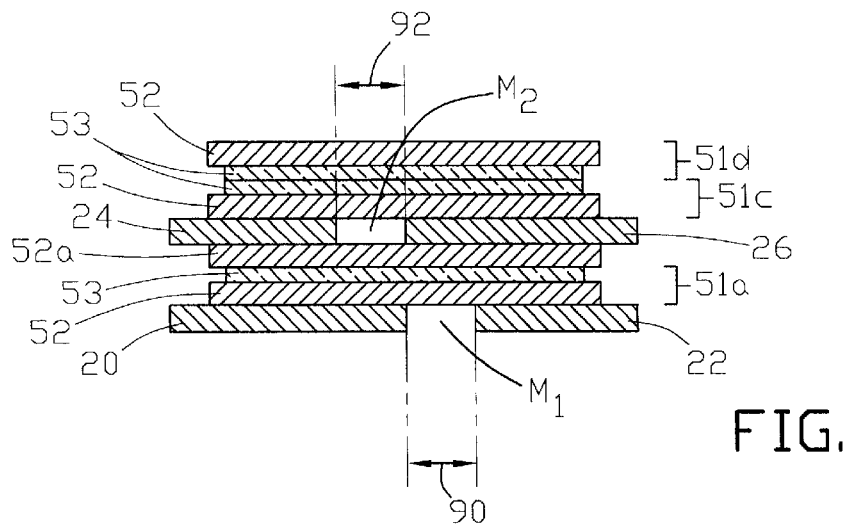
FIG. 5(a) is a cross section view of one example of the invention wherein a dielectric layer 52a replaces one of the two metalized film layers in one of the at least two adjacent composite layers.
Figure 5B:
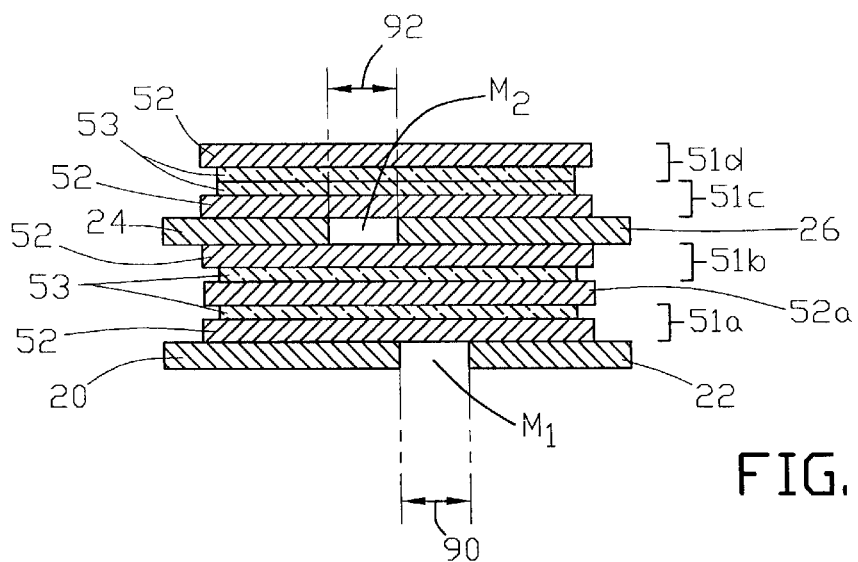
FIG. 5(b) is a cross section view of one example of the invention wherein a dielectric layer 52a is disposed between the two metalized film layers in at least one of the two adjacent composite layers.
Figure 5C:
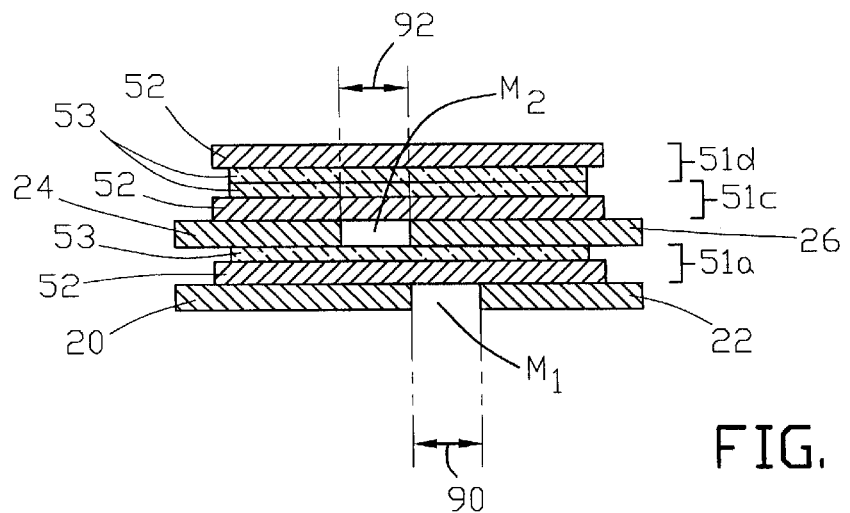
FIG. 5(c) is a cross section view of one example of the invention wherein one metalized film layer replaces the two metalized film layers in one of the at least two adjacent composite layers.

Referring now to the drawings, wherein like numerals indicate like elements, there is shown in FIGS. 2, 3 and 4, in accordance with the present invention, one embodiment of a wound capacitor 10 with improved heat transfer characteristics. As illustrated by the cross sectional view in FIG. 2, the capacitor has a first electrode layer formed from first and second metallic foils that serve as first and second metal electrodes, 20 and 22, respectively. These two electrodes have unequal cross sectional widths and are separated from each other along their adjacent longitudinal ends by the width of an open region that is referred to as a margin. Electrodes 20 and 22 are substantially equal in length. A suitable, but non-exclusive, material for the electrodes is aluminum foil with a thickness of 0.0006 cm. Since electrodes 20 and 22 will form the anode and cathode of the capacitor 10, the width 90 of the first margin $M_1$ between electrodes 20 and 22 must be sufficient to withstand the applied working voltage for capacitor 10. A typical, but non-limiting, width of the first margin $M_1$ for a working voltage at 600 volts ac is on the order of 0.4 cm. In FIG. 2, a first metalized film layer 51a is placed adjacent to the first layer of metal electrodes 20 and 22. The metalized film layer can be formed by vapor depositing an electrically conductive metalized film 53, such as aluminum, on a dielectric substrate 52. The thickness of the metalized film (in the range of angstroms) is insignificant in comparison with the thickness of the dielectric substrate. A suitable, but non-exclusive, material for the dielectric substrate 52 is polypropylene with a thickness of 0.001 cm. The first layer of metalized film has its dielectric substrate 52 facing the first electrode layer. A second layer of metalized film 51b is placed over the first metalized film layer 51a with its metalized film 53 adjacent to the metalized film in first metalized film 51a. As mentioned above, this typical configuration is used to double the thickness of the metalized film 53. A second electrode layer consists of third and fourth metallic foils which serve as third and fourth electrodes, 24 and 26, respectively. Similar to first and second electrodes 20 and 22, third and fourth 24 and 26 electrodes have unequal cross sectional widths and are separated from each other along their adjacent longitudinal ends by a margin, which is referred to as the second margin $M_2$ with a width 92. Electrodes 24 and 26 are substantially equal in length. As shown in FIG. 2, electrodes 20 and 26 are defined as being diagonally opposite from each other. Similarly, electrodes 22 and 24 are defined as being diagonally opposite from each other. As shown in FIG. 2, a third metalized film layer 51c is placed over the second electrode layer and oriented so that its dielectric substrate 52 is adjacent to the second electrode layer. A fourth metalized film layer 51d is placed over the third metalized film layer 51c with its metalized film 53 placed adjacent to the metalized film in the third metalized film layer 51c. Generally, the same materials are used for all metalized film layers and metal electrodes in the fabrication of the capacitor 10. However, the artisan will appreciate that different materials may be used, for example, in different metalized film layers, without deviating from the invention in any of its embodiments.

Generally, without respect to an absolute order of layering around the core, the capacitor of the present invention is made up of at least two adjacent composite layers, where a composite layer is formed from a minimum of one electrode layer and two metalized film layers. For example, in FIG. 2, the electrode layer formed by electrodes 24 and 26 and the two metalized film layers 51c and 51d is a composite layer.

As shown in FIG. 2, for two adjacent composite layers, the composite layers are similarly disposed to each other, but do have an offset in the margins $M_1$ and $M_2$ in the electrode layers of adjacent composite layers. In addition to the two metalized film layers in the preferred embodiment, the artisan will appreciate that variations in layering can be accomplished without deviating from the scope of the invention. For example, a dielectric layer can be placed between adjoining dielectric substrates of two metalized film layers in adjacent composite layers, or between a metalized film layer adjacent to an electrode layer. Alternatively, one of the two metalized film layers can be replaced in at least one composite layer by a single metalized film layer when its metalized film is adjacent to a dielectric layer, or the dielectric substrate of a metalized film layer. These alternative embodiments, and other permutations and combinations with dielectric layers, and single or multiple metalized film layers, practice an objective of the invention, namely bringing the metalized film in the region of a margin closer to an electrode layer.

In the preferred embodiment of the invention, margin widths 90 and 92 are equal and the relative sides of each margin (for example, the left hand sides of the margin $M_1$ and $M_2$ in FIG. 2) are offset from each other by one margin width. Consequently, the objective of the invention is obtained in the embodiment illustrated in FIG. 2. The farthest distance from all (including the center) of the metalized film bridging the margin to the surface of a metal electrode is approximately equal to the thickness of one dielectric substrate, rather than half the width of the margin. As mentioned previously, the metal electrodes serve as heat sinks for heat transfer from the windings of the capacitor. Using the typical values noted above for the thickness of the dielectric layer (0.001 cm) and width of the margin (0.4 cm), the center of the metalized film bridging each margin is now 200 times (0.001 cm versus 0.2 cm) closer to the surface of the metal electrodes. FIG. 3, which illustrates the cross sectional view of two coils of the capacitor 10, further illustrates the advantage of this arrangement. Consequently, a significant gain in current capacity can be achieved with a capacitor employing the offset margin design over a prior art capacitor using the same amount of materials.

One method of connecting electrodes 20, 22, 24, and 26 to an external circuit is by extending the outer longitudinal ends of the electrodes beyond the outer longitudinal ends of the metalized film layers as shown in FIG. 2. For this arrangement, the outer longitudinal ends of electrodes 20 and 24 can be joined together, as can the outer longitudinal ends of electrodes 22 and 26. In this fashion, the capacitor 10 is formed by two parallel capacitors wound together with the first and second margins having equal widths and being offset by the width of a margin.

An artisan will appreciate that the first and second margins could be offset by more or less than one margin width as described above. An offset of less than one margin width will result in some overlap of the first and second margins. However, a gain in current capacity, albeit a reduced gain, can still be achieved with this arrangement. An artisan will appreciate that an offset of more than one margin width, and unequal widths of first and second margins, will also achieve the objective of the invention.

In alternative embodiments of the invention, one or more of the four metalized film layers can be replaced with a dielectric layer. For example, metalized film layers 51b and 51d can be replaced by a dielectric layer for a capacitor of the present invention with single thickness metalized film conductors. In these embodiments, a composite layer is formed from the electrode layer formed by electrodes 20 and 22, metalized film layer 51a and the dielectric layer substituted for metalized film layer 51b, or from the electrode layer formed by electrodes 24 and 26, metalized film layer 51c, and the dielectric layer substituted for metalized film layer 51d.

FIG. 4 illustrates how the embodiment of the present invention shown in FIG. 2 can be manufactured. Substantially equal-length spools of the first and fourth electrodes, 20 and 26 (with substantially equal widths), the second and third electrodes, 22 and 24 (with substantially equal widths), and the four metalized film layers 51a, 51b, 51c and 51d (with substantially equal widths) are arranged so that they can be spooled onto a core 95 with orientations shown in FIGS. 2 and 4. During the winding of the capacitor 10, margin widths 90 and 92 are maintained between the adjacent longitudinal ends of the metal electrodes 20 and 22, and 24 and 26, respectively, as well as the offset distance between the two margins.

The artisan will appreciate that the layers shown in FIG. 2 and FIG. 4 may be reverse-wound without deviating from the scope of the invention. In other words, the fourth metalized film layer 51d may be the first layer wound around the core. In alternative embodiments of the invention, where one or more of the second, third, fifth, or sixth layer is replaced by a dielectric layer, the first layer wound onto the core may be an electrode layer, a metalized film layer or a dielectric layer. In these alternative embodiments, the layering sequence is modified accordingly. For example, in FIG. 4, if one elects to wind metalized film layer 51a as the first layer around the core, the following alternative layering sequence may be used. Following first metalized film layer 51a are, in turn: metalized film layer 51b; electrode layer composed of electrodes 24 and 26; metalized film layer 51c; metalized film layer 51c; and electrode layer composed of electrodes 20 and 22. In alternative embodiments of the invention, selection of the first layer to be wound around the core will not alter the practice of the invention as long as the margins in adjacent electrode layers are offset.

If the core is electrically non-conductive, the core may alternatively be left in or removed from the wound capacitor. If the core is removed from the capacitor, the wound capacitor may be flattened. One reason for doing so is to accommodate packaging of the capacitor. After all layers are completely wound, a fastening means, such as non-conducting tape, can be used to secure the layers of the capacitor in place. The two axial ends of the capacitor (one end 80 is visible in FIG. 4) are typically sprayed with a conductive metal, such as copper, and then coated with solder in order to form acceptable electrical connections to the outer longitudinal ends of the metal electrodes. For impregnation, the solder-covered surface can then be scored to the outer longitudinal edges of the metalized film layers 51a, 51b, 51c, and 51d, to allow the injection of an oil into the layers through the incisions created by the scoring. The oil provides added dielectric strength to the capacitor and provides a damping effect for capacitive overloads. After sealing the incisions, a wire, plate, or other terminal device (not shown in FIG. 4), can be connected to each axial end of the capacitor 10. A plate is preferred since it can serve as an electrical conductor, heat sink, and mounting structure for the capacitor to an external air or liquid-cooled heat sink. Suitable, but non-exclusive, material for the plate is silver-plated copper.

The capacitor 10 of the present invention, in all of its embodiments and variations, provides a significant increase in current carrying capacity while staying within an allowable temperature rise, particularly at high frequencies, while using the same quantity of materials and having the same capacitance as a prior art capacitor.

The present invention may be embodied in other specific forms without departing from the spirit or essential attributes thereof. Accordingly, reference should be made to the appended claims, rather than to the foregoing specification, as indicating the scope of the invention.

What is claimed is:

1. An axially wound capacitor with improved heat transfer characteristics, said capacitor formed by at least two adjacent composite layers, each composite layer comprising:
   a minimum of one electrode layer and two metalized film layers;
   the electrode layer further comprising two metal electrodes separated by a margin; the two metal electrodes having outer longitudinal ends disposed at opposite axial ends of the capacitor; the outer longitudinal ends at each axial end of the capacitor electrically connected together;
   each of the two metalized film layers further comprising a metalized film on a dielectric substrate;
   the metalized film of each of the two metalized film layers disposed adjacent to each other;
   wherein the margin in the electrode layer of one of the at least two adjacent composite layers is offset from the margin in the electrode layers of the other of the at least two adjacent composite layers.

2. The axially wound capacitor of claim 1 wherein the transverse widths of diagonally opposed metal electrodes in adjacent electrode layers are equal.

3. The axially wound capacitor of claim 1 wherein the width of the margins in all of the electrode layers of the capacitor are equal.

4. The axially wound capacitor of claim 3 wherein the margins of adjacent electrode layers are offset by the width of one margin.

5. The axially wound capacitor of claim 1 wherein a dielectric layer is disposed between the two metalized film layers of at least one of the at least two adjacent composite layers.

6. An axially wound capacitor with improved heat transfer characteristics, said capacitor comprising:
   at least two first and second adjacent composite layers, the first adjacent composite layer comprising:
      a first electrode layer, the first electrode layer having first and second metal electrodes separated by a first margin; the first and second metal electrodes having outer longitudinal ends disposed at opposite axial ends of the capacitor; the outer longitudinal ends at each axial end of the capacitor electrically connected together;
      a metalized film layer having a metalized film on a dielectric substrate; and
      a dielectric layer;
      the metalized film of the metalized film layer disposed adjacent to the dielectric layer;
   the second adjacent composite layer comprising:
      a second electrode layer, the second electrode layer having third and fourth metal electrodes separated by a second margin; the third and fourth metal electrodes having outer longitudinal ends disposed at opposite axial ends of the capacitor; the outer longitudinal ends at each axial end of the capacitor electrically connected together;
      two metalized film layers, each of the two metalized film layers further comprising a metalized film on a dielectric substrate, the metalized film of each of the two metalized film layers disposed adjacent to each other;

wherein the first margin of the first electrode layer is offset from the second margin in the second electrode layer of the at least two first and second adjacent composite layers.

7. An axially wound capacitor with improved heat transfer characteristics, said capacitor formed by at least two adjacent composite layers, each composite layer comprising:

an electrode layer and at least one metalized film layer;
        the electrode layer comprising two metal electrodes separated by a margin; the two metal electrodes having outer longitudinal ends disposed at opposite axial ends of the capacitor; the outer longitudinal ends at each axial end of the capacitor electrically connected together; and
        the at least one metalized film layer comprising a metalized film on a dielectric substrate, the substrate of the at least one metalized film layer disposed adjacent to the electrode layer;

wherein the margin in the electrode layer of one of the at least two adjacent composite layers is offset from the margin in the electrode layer of the other of the at least two adjacent composite layers.

8. A wound capacitor with improved heat transfer characteristics, said capacitor formed by layers comprising:

a first electrode layer, further comprising first and second metal electrodes and a first margin between adjacent longitudinal ends of said first and second electrodes;

a first metalized film layer, further comprising a first metalized film on a first dielectric substrate, said first dielectric substrate disposed adjacent to the first electrode layer;

a second metalized film layer, further comprising a second metalized-film on a second dielectric substrate, said second metalized-film disposed adjacent to the first metalized film;

a second electrode layer, further comprising third and fourth metal electrodes and a second margin between adjacent longitudinal ends of said third and fourth electrodes, said first and third electrodes having their outer longitudinal ends disposed at a first axial end of said capacitor, and said second and fourth electrodes having their outer longitudinal ends disposed at a second axial end of said capacitor;

a third metalized film layer, further comprising a third metalized-film on a third dielectric substrate, said third dielectric substrate disposed adjacent to the second electrode layer; and a fourth metalized film layer, further comprising a fourth metalized-film on a fourth dielectric substrate, said fourth metalized-film disposed adjacent to the third metalized-film, wherein the second margin is offset from the first margin.

9. The wound capacitor of claim 8 wherein the transverse widths of said first and fourth metal electrodes are equal, and the transverse widths of said second and third metal electrodes are equal.

10. The wound capacitor of claim 8 wherein the widths of said first and second margins are equal.

11. The wound capacitor of claim 10 wherein said first and second margins are offset by the width of a selected one of said first and second margins.

12. A wound capacitor with improved heat transfer characteristics, said capacitor formed by layers comprising:

a first electrode layer, further comprising first and second metal electrodes and a first margin between adjacent longitudinal ends of said first and second electrodes;

a first metalized film layer, further comprising a first metalized film on a first dielectric substrate, said first dielectric substrate disposed adjacent to the first electrode layer;

a first dielectric layer;

a second electrode layer, further comprising third and fourth metal electrodes and a second margin between adjacent longitudinal ends of said third and fourth electrodes, said first and third electrodes having their outer longitudinal ends disposed at a first axial end of said capacitor, and said second and fourth electrodes having their outer longitudinal ends disposed at a second axial end of said capacitor;

a second metalized film layer, further comprising a second metalized-film on a second dielectric substrate, said second dielectric substrate disposed adjacent to the second electrode layer; and a second dielectric layer, wherein the second margin is offset from the first margin.

13. A method of manufacturing a wound capacitor with improved heat transfer characteristics, the method comprising:

simultaneously winding layers of substantially equal length around a core, said layers comprising:

a first layer consisting of first and second metal electrodes wound with a first margin between adjacent longitudinal ends of the first and second electrodes, said first layer in contact with the core;

a second layer consisting of a metalized film, further comprising a metalized film on a dielectric substrate, said substrate in contact with the first layer;

a third layer consisting of a metalized film, further comprising a metalized film on a dielectric substrate, said metalized film in contact with the second layer;

a fourth layer consisting of third and fourth metal electrodes wound with a second margin between adjacent outer longitudinal ends of said third and fourth electrodes, orienting said first and third electrodes with their outer longitudinal ends at a first axial end of the capacitor, and said second and fourth electrodes with their outer longitudinal ends at a second axial end of the capacitor, and offsetting said second margin from the first margin, said fourth layer in contact with the third layer;

a fifth layer consisting of a metalized film, further comprising a metalized film on a dielectric substrate, said substrate in contact with the fourth layer; and a sixth layer consisting of a metalized film, further comprising a metalized film on a dielectric substrate, said metalized film in contact with said fifth layer.

14. The method of manufacturing the wound capacitor in claim 13 wherein the layers are reverse-wound on the core.

15. The method of manufacturing the wound capacitor in claim 13 wherein said core is electrically non-conductive.

16. The method of manufacturing the wound capacitor in claim 13 further comprising the step of removing said core from the wound capacitor.

17. The method of manufacturing the wound capacitor in claim 16 further comprising the step of flattening the wound capacitor after removing said core.

18. The method of manufacturing the wound capacitor in claim 13 wherein the outer longitudinal ends of the first, second, third, and fourth metal electrodes extend beyond outer longitudinal ends of said second, third, fifth, and sixth layers.

19. The method of manufacturing the wound capacitor in claim 18 comprising the further steps of:

spraying first and second axial ends of the wound capacitor with a conductive metal to form a common electrical connection between said first and third metal electrodes and between said second and fourth metal electrodes; and attaching an electrical terminal at each of said axial ends of the wound capacitor.

20. The method of manufacturing the wound capacitor in claim 13 wherein the transverse widths of said first and fourth metal electrodes are made equal and the transverse widths of said second and third metal electrodes are made equal.

21. The method of manufacturing the wound capacitor in claim 20 wherein said first and second margins are offset by the width of one of said first and second margins.

22. The method of manufacturing the wound capacitor in claim 13 wherein the widths of said first and second margins are made equal.

23. A method of manufacturing a wound capacitor with improved heat transfer characteristics, the method comprising:

simultaneously winding layers of substantially equal length around a core, said layers comprising:
a first layer consisting of first and second metal electrodes wound with a first margin between adjacent longitudinal ends of the first and second electrodes, said first layer in contact with the core;
a second layer consisting of a metalized film, further comprising a metalized film on a dielectric substrate, said substrate in contact with the first layer;
a third layer consisting of a metalized film, further comprising a metalized film on a dielectric substrate, said metalized film in contact with the second layer;
a fourth layer consisting of third and fourth metal electrodes wound with a second margin between adjacent outer longitudinal ends of said third and fourth electrodes, orienting said first and third electrodes with their outer longitudinal ends at a first axial end of the capacitor, and said second and fourth electrodes with their outer longitudinal ends at a second axial end of the capacitor, and offsetting said second margin from the first margin, said fourth layer in contact with the third layer;
a fifth layer consisting of a metalized film, further comprising a metalized film on a dielectric substrate, said substrate in contact with the fourth layer;
a sixth layer consisting of a metalized film, further comprising a metalized film on a dielectric substrate, said metalized film in contact with said fifth layer;
wherein the outer longitudinal ends of the first, second, third, and fourth metal electrodes extend beyond outer longitudinal ends of said second, third, fifth, and sixth layers;

spraying first and second axial ends of the wound capacitor with a conductive metal to form a common electrical connection between said first and third metal electrodes and between said second and fourth metal electrodes;

coating said axial ends of the wound capacitor with a solder;

scoring said axial ends of the wound capacitor to the outer longitudinal ends of said second, third, fifth, and sixth layers, injecting oil into scored incisions, and sealing said incisions; and attaching an electrical terminal at each of said axial ends of the wound capacitor.

24. A method of manufacturing a wound capacitor with improved heat transfer characteristics, the method comprising:

simultaneously winding layers of substantially equal length around a core, said layers comprising:
a first layer consisting of first and second metal electrodes wound with a first margin between adjacent longitudinal ends of the first and second electrodes, said first layer in contact with the core;
a second layer consisting of a metalized film, further comprising a metalized film on a dielectric substrate said substrate in contact with the first layer;
a third layer consisting of a dielectric layer;
a fourth layer consisting of third and fourth metal electrodes wound with a second margin between adjacent outer longitudinal ends of said third and fourth electrodes, orienting said first and third electrodes with their outer longitudinal ends at a first axial end of the capacitor and said second and fourth electrodes with their outer longitudinal ends at a second axial end of the capacitor, and offsetting said second margin from the first margin said fourth layer in contact with the third layer;
a fifth layer consisting of a metalized film, further comprising a metalized film on a dielectric substrate, said substrate in contact with the fourth layer;
a sixth layer consisting of a dielectric layer;
wherein the outer longitudinal ends of the first, second, third, and fourth metal electrodes extend beyond outer longitudinal ends of said second, third, fifth, and sixth layers;

spraying first and second axial ends of the wound capacitor with a conductive metal to form a common electrical connection between said first and third metal electrodes and between said second and fourth metal electrodes;

coating said axial ends of the wound capacitor with a solder;

scoring said axial ends of the wound capacitor to the outer longitudinal ends of said second, third, fifth, and sixth layers, injecting oil into scored incisions, and sealing said incisions; and attaching an electrical terminal at each of said axial ends of the wound capacitor.

25. The method of manufacturing the wound capacitor in claim 24 wherein the layers are reverse-wound on the core.

* * * * *